(12) United States Patent
Jiang et al.

(10) Patent No.: US 12,725,873 B2
(45) Date of Patent: Sep. 1, 2026

(54) BATTERY COMPARTMENT, CHASSIS, AND VEHICLE

(71) Applicant: CONTEMPORARY AMPEREX TECHNOLOGY (HONG KONG) LIMITED, Hong Kong (CN)

(72) Inventors: Liwen Jiang, Ningde (CN); Wumei Fang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 325 days.

(21) Appl. No.: 18/618,848

(22) Filed: Mar. 27, 2024

(65) Prior Publication Data

US 2024/0243408 A1 Jul. 18, 2024

Related U.S. Application Data

(63) Continuation of application No. PCT/CN2022/128025, filed on Oct. 27, 2022.

(30) Foreign Application Priority Data

Nov. 4, 2021 (CN) ......................... 202111302274.2

(51) Int. Cl.
*H01M 50/249* (2021.01)
*B60K 1/04* (2019.01)
(Continued)

(52) U.S. Cl.
CPC ............. *H01M 50/249* (2021.01); *B60K 1/04* (2013.01); *B62D 21/11* (2013.01);
(Continued)

(58) Field of Classification Search
CPC ............. H01M 50/209; H01M 50/249; H01M 2220/20; B60K 1/04; B60K 2001/0438; B62D 21/11
See application file for complete search history.

(56) References Cited

U.S. PATENT DOCUMENTS 10,611,408 B2 * 4/2020 Fritz ...................... B62D 21/02
11,837,740 B2 * 12/2023 Miyoshi ............. H01M 50/249
(Continued)

FOREIGN PATENT DOCUMENTS

CN 206022488 U 3/2017
CN 207374101 U 5/2018
(Continued)

OTHER PUBLICATIONS

The European Patent Office (EPO) The Extended European Search Report for Application No. 22889185.9 Sep. 16, 2024 8 Pages.
(Continued)

*Primary Examiner* — Edwin A Young
(74) *Attorney, Agent, or Firm* — ANOVA LAW GROUP, PLLC

(57) ABSTRACT

A battery compartment includes a battery compartment frame for accommodating battery modules, and at least two battery modules disposed in the battery compartment frame. Each of the battery modules includes a plurality of battery cells and two end plates, the plurality of battery cells are arranged in a first direction, and the two end plates are respectively disposed on two ends of the plurality of battery cells in the first direction. The at least two battery modules are arranged in a row in the first direction, and the at least two battery modules and the battery compartment frame are configured to be in interference-fit in the first direction.

16 Claims, 4 Drawing Sheets

(51) Int. Cl.
*B62D 21/11* (2006.01)
*H01M 50/209* (2021.01)

(52) U.S. Cl.
CPC ... *H01M 50/209* (2021.01); *B60K 2001/0438* (2013.01); *H01M 2220/20* (2013.01)

(56) References Cited

U.S. PATENT DOCUMENTS

| | | | | |
|---|---|---|---|---|
| 2018/0108890 | A1* | 4/2018 | Fees | H01M 50/24 |
| 2020/0220125 | A1 | 7/2020 | Caliskan et al. | |
| 2021/0188069 | A1 | 6/2021 | Friedman | |
| 2021/0273286 | A1* | 9/2021 | Yamazaki | H01M 50/291 |
| 2022/0384887 | A1* | 12/2022 | Utsumi | H01M 50/231 |

FOREIGN PATENT DOCUMENTS

| | | | |
|---|---|---|---|
| CN | 108202590 | A | 6/2018 |
| CN | 109178097 | A | 1/2019 |
| CN | 210200810 | U | 3/2020 |
| CN | 112133858 | A | 12/2020 |
| CN | 112201891 | A | 1/2021 |
| CN | 113060303 | A | 7/2021 |
| CN | 213768245 | U | 7/2021 |
| CN | 220923820 | U | 5/2024 |
| EP | 4044345 | A1 | 8/2022 |
| KR | 20200064260 | A | 6/2020 |

OTHER PUBLICATIONS

The World Intellectual Property Organization (WIPO) International Search Report for PCT/CN2022/128025 Dec. 29, 2022 5 Pages (including translation).

China National Intellectual Property Administration (CNIPA) The First Office Action for Application No. 202111302274.2 Jan. 28, 2026 16 Pages (including translation).

* cited by examiner

1

2

4

3

BATTERY COMPARTMENT, CHASSIS, AND VEHICLE

CROSS-REFERENCE TO RELATED APPLICATIONS

The present application is a continuation of International Application No. PCT/CN2022/128025, filed on Oct. 27, 2022, which claims the priority of Chinese patent application no. 202111302274.2, entitled "BATTERY COMPARTMENT, CHASSIS, AND VEHICLE" and filed on Nov. 4, 2021, the entire contents of which are incorporated herein by reference.

TECHNICAL FIELD

The present application relates to the field of vehicles, and in particular to a battery compartment, a chassis and a vehicle.

BACKGROUND ART

In an existing electric vehicle, battery cells in a battery compartment are typically fixed in the battery compartment using an adhesive, so that it will be difficult to repair and replace the battery cells when they fail. Therefore, how to improve the replacement and repair performance of the battery cells in the battery compartment is a technical problem to be solved urgently for the electric vehicle.

SUMMARY

In various aspects of the present application, a battery compartment, a chassis and a vehicle are provided, which can improve the replacement and repair performance of the battery compartment of an electric vehicle.

In a first aspect of the present application, a battery compartment is provided. The battery compartment includes: a battery compartment frame for accommodating battery modules; and at least two battery modules disposed in the battery compartment frame; wherein each of the battery modules includes a plurality of battery cells and two end plates, the plurality of battery cells are arranged in a first direction, and the two end plates are respectively disposed on two ends of the plurality of battery cells in the first direction; the at least two battery modules are arranged in a row in the first direction; and the at least two battery modules and the battery compartment frame are configured to be in interference-fit in the first direction.

In this embodiment, by means of allowing the at least two battery modules and the battery compartment frame to be configured in interference-fit in the first direction, the battery cells are fixed in the battery compartment frame in a clamped manner in the first direction, so that the battery cells are fixed without using an adhesive, and it is also convenient to remove the battery modules for repair and replacement of the battery cells, thereby improving the replacement and repair performance of the battery cells in the battery compartment.

In some embodiments, a first lifting slot is formed between the two adjacent end plates of the two adjacent battery modules; and a second lifting slot is formed between the battery compartment frame and the end plate adjacent to the battery compartment frame. By means of providing the first lifting slot and the second lifting slot, lifting tongs can operate to remove or place a single battery module, and during the removal or placement of the battery module, operation arms of the lifting tongs extend into the first lifting slot and the second lifting slot and apply pressing force to the battery module in the first direction so as to change the size of the battery module in the first direction after being pressed, so that the battery module can be conveniently removed or placed.

In some embodiments, the two adjacent end plates of the two adjacent battery modules are connected by means of a first engagement structure. The first engagement structure can achieve mutual positioning of the two battery modules and reduce the assembly gap between the two battery modules, thereby improving the space utilization of the battery compartment. Also, the two end plates are connected by means of the first engagement structure, and the combined structure of the two end plates can also reinforce the entire battery compartment, and can function to replace an intermediate member located between two adjacent battery modules in an existing battery compartment and arranged in a third direction perpendicular to the first direction, so that the internal structure of the battery compartment is more compact, and the space utilization is high.

In some embodiments, the first engagement structure includes a first protrusion provided on one of the two adjacent end plates of the two adjacent battery modules and a first recess provided on the other end plate, the first protrusion being connected to the first recess in an engagement manner. The first engagement structure includes the first protrusion and the first recess respectively provided on the two end plates of the two adjacent battery modules, and the first protrusion is connected to the first recess in an insertion manner to form the first engagement structure, which can achieve mutual limiting of the two battery modules in the third direction perpendicular to the first direction.

In some embodiments, the first protrusion protrudes in the first direction, and the first recess is recessed in the first direction; the first protrusion and the first recess extend in a second direction; the second direction is perpendicular to the first direction; and on at least one end in the second direction, the first recess is provided with a first insertion opening through which the first protrusion is inserted or removed. The first protrusion and the first recess are connected to each other in an insertion manner in the first direction to form the first engagement structure. When the battery module is mounted or removed, the first protrusion is inserted into or exits from the first recess through the first insertion opening in the second direction so as to achieve connection or separation of the two battery modules.

In some embodiments, the first protrusion is provided with a first lifting slot recessed in the first direction and extending in the second direction; and the first lifting slot is provided with a second insertion opening on at least one end in the second direction. The first lifting slot is provided on the first protrusion, so that the first lifting slot can be arranged by making full use of space of the first protrusion, which facilitates operation of the lifting tongs.

In some embodiments, the battery compartment frame includes two first side members disposed oppositely in the first direction; the at least two battery modules include a battery module connected to one of the first side members; and one end plate, opposite to one of the first side members, of the battery module connected to the first side member is connected to the first side member by means of a second engagement structure. The second engagement structure is disposed on the first side member and one end plate of the battery module opposite to the first side member, which can achieve connection and limiting of the first side member and the battery module adjacent to the first side member.

In some embodiments, the second engagement structure includes a second protrusion provided on one of the first side member and the end plate opposite to the first side member and a second recess provided on the other of the first side member and the end plate opposite to the first side member, the second protrusion being connected to the second recess in an engagement manner. The second engagement structure includes the second protrusion and the second recess respectively provided on the first side member and the end plate of the battery module opposite to the first side member, and the second protrusion is connected to the second recess in an insertion manner to form the second engagement structure, which can achieve mutual limiting of the first side member and the battery module adjacent to the first side member in the third direction perpendicular to the first direction.

In some embodiments, the second protrusion protrudes in the first direction, and the second recess is recessed in the first direction; the second protrusion and the second recess extend in the second direction; the second direction is perpendicular to the first direction; and on at least one end in the second direction, the second recess is provided with a third insertion opening through which the second protrusion is inserted or removed. The second protrusion and the second recess are connected to each other in an insertion manner in the first direction to form the second engagement structure. When the battery module is mounted or removed, the second protrusion is inserted into or exits from the second recess through the third insertion opening in the second direction, so that the battery module is connected to or separated from the first side member.

In some embodiments, the second protrusion is provided with a second lifting slot recessed in the first direction and extending in the second direction; and the second lifting slot is provided with a fourth insertion opening on at least one end in the second direction. The second lifting slot is provided on the second protrusion, so that the second lifting slot can be arranged by making full use of space of the second protrusion, which facilitates operation of the lifting tongs.

In some embodiments, multiple rows of the battery modules are provided in the battery compartment frame; the multiple rows of the battery modules are arranged in the third direction perpendicular to the first direction; and an intermediate member is provided between the two adjacent rows of the battery modules, and two ends of the intermediate member are respectively connected to the first side members. By means of providing the intermediate member, the position of each row of the battery modules in the third direction can be limited, and the intermediate member can also reinforce the battery compartment frame.

In a second aspect of the present application, a chassis is provided. The chassis includes the battery compartment frame in the above embodiments, and end frames for mounting suspensions. The end frames are connected to end portions of the battery compartment frame of the battery compartment in the first direction. The battery compartment is directly connected to the end frames, so that cross members, longitudinal members and other structures at a cab part of a conventional chassis are omitted, greatly reducing the number of components of the vehicle, which improves the space utilization of the chassis and is conducive to carrying more batteries in the battery compartment, thereby further improving the endurance of the vehicle.

In some embodiments, the end frames include a front end frame and a rear end frame.

In some embodiments, the end frame includes two frame longitudinal members, two shock absorber towers and a first cross member, wherein each of the frame longitudinal members is provided with one shock absorber tower; a set of suspensions are mounted on each of the frame longitudinal members and the corresponding shock absorber tower; and the two frame longitudinal members are connected to the battery compartment frame. In this embodiment, the end frame includes two frame longitudinal members and two shock absorber towers, a set of suspensions are mounted on each frame longitudinal member and the corresponding shock absorber tower. The suspensions are directly mounted on the frame longitudinal members and the shock absorber towers, so that a subframe and other suspension mounting structures of the vehicle can be omitted, greatly reducing the number of components of the end frames to achieve higher integration level. The two frame longitudinal members are mounted at the end portions of the battery compartment, and the end frames are directly carried by the battery compartment, which omits the cross members, longitudinal member and other structures of the vehicle body, so that the entire chassis has a compact structure and less components and is lightweight.

In some embodiments, the frame longitudinal member is further provided with a motor mounting base. By means of providing the motor mounting base, a driving motor can be mounted on and supported by the frame longitudinal members, which further improves the compactness of the chassis and reduces the number of components.

In a third aspect of the present application, a vehicle is provided. The vehicle includes the chassis of a vehicle in the above embodiments.

The aforementioned description is merely an overview of the technical solutions of the embodiments of the present application. In order to more clearly understand the technical means of the embodiments of the present application to implement the technical means according to the content of the specification, and in order to make the above and other objectives, features and advantages of the embodiments of the present application more obvious and understandable, specific implementations of the present application are illustratively described below.

BRIEF DESCRIPTION OF THE DRAWINGS

In order to more clearly illustrate the technical solutions in the embodiments of the present application, the drawings to be used in the description of the embodiments will be described briefly below. Obviously, the drawings in the following description are merely some embodiments of the present application. For those of ordinary skill in the art, other drawings can also be obtained according to these drawings without involving any inventive effort.

DETAILED DESCRIPTION OF EMBODIMENTS

Figure 1:
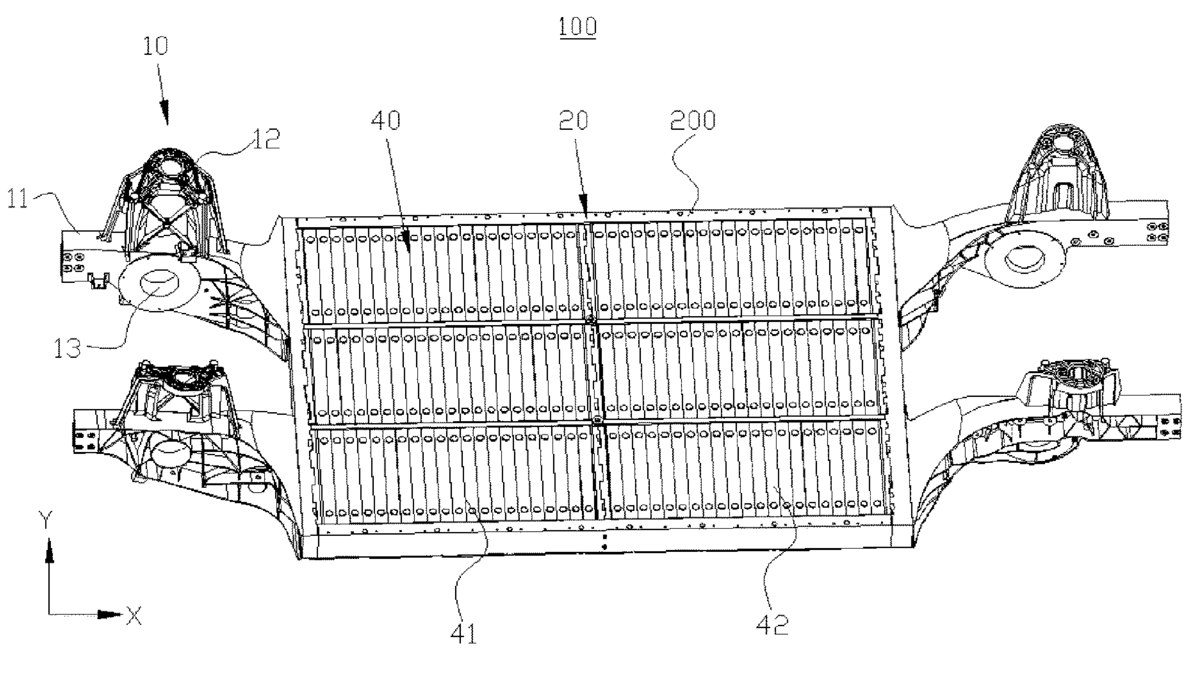
FIG. 1 is a schematic diagram of a structure of a chassis of a vehicle according to some embodiments of the present application.

In order to make the objectives, technical solutions and advantages of embodiments of the present application clearer, the technical solutions in the embodiments of the present application will be described clearly and completely below with reference to the accompanying drawings in the embodiments of the present application. Apparently, the embodiments described are some, but not all, embodiments of the present application. All other embodiments obtained by those of ordinary skill in the art on the basis of the embodiments of the present application without involving any inventive effort shall fall within the scope of protection of the present application.

Unless otherwise defined, all technical and scientific terms used herein have the same meanings as those commonly understood by those skilled in the art to which the present application belongs. The terms used in the description of the present application herein are merely for the purpose of describing the specific embodiments, but are not intended to limit the present application. The terms "including" and "having" and any variations thereof in the specification and the claims of the present application as well as the brief description of the accompanying drawings described above are intended to cover non-exclusive inclusion.

The phrase "embodiment" mentioned herein means that the specific features, structures, or characteristics described in conjunction with the embodiment can be encompassed in at least one embodiment of the present application. The phrase at various locations in the specification does not necessarily refer to the same embodiment, or an independent or alternative embodiment exclusive of another embodiment. Those skilled in the art understand explicitly or implicitly that the embodiment described herein may be combined with another embodiment.

The term "and/or" herein is merely the description of an associated relationship of associated objects, and indicates that three relationships may exist. For example, A and/or B may indicate: only A exists, both A and B exist, and only B exists. In addition, the character "/" herein generally indicates an "or" relationship between the associated objects.

In the description of the present application, it should be understood that the orientation or positional relationships indicated by the terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", "circumferential", etc. are based on the orientation or positional relationships shown in the accompanying drawings and are merely for ease of description of the present application and simplification of the description, rather than indicating or implying that the devices or elements referred to must have a specific orientation or be constructed and operated in a described orientation, and therefore cannot be construed as limiting the present application. In addition, the terms "first", "second", etc. in the specification, the claims, or the accompanying drawings of the present application are used for distinguishing different objects, instead of describing a specific order, and thus can explicitly or implicitly include one or more features. In the description of the present application, the term "a plurality of" means two or more, unless otherwise specified.

In the description of the present application, it should be noted that the terms "mounting", "connecting", and "connection" should be interpreted in the broad sense unless explicitly defined and limited otherwise. For example, the connection may be a fixed connection, a detachable connection, or an integral connection; or may be a mechanical connection or an electrical connection; or may be a direct connection, an indirect connection by means of an intermediate medium, or internal communication between two elements. For those of ordinary skill in the art, the specific meanings of the terms in the present application can be construed according to specific circumstances.

In the present application, the battery cell may include a lithium-ion secondary battery cell, a lithium-ion primary battery cell, a lithium-sulfur battery cell, a sodium-lithium-ion battery cell, a sodium-ion battery cell, a magnesium-ion battery cell, etc., which will not be limited in the embodiments of the present application. The battery cell may be cylindrical, flat, cuboid or in other shapes, which will also not be limited in the embodiments of the present application. The battery cells are generally classified into three types depending on the way of package: cylindrical battery cells, prismatic battery cells and pouch battery cells, which will also not be limited in the embodiments of the present application.

The battery mentioned in the embodiments of the present application refers to a single physical module including one or more battery cells to provide a higher voltage and capacity. For example, the battery mentioned in the present application may include a battery module, a battery pack, etc. The battery generally includes a case for packaging one or more battery cells. The case can prevent liquid or other foreign matters from affecting charging or discharging of the battery cells.

The technical solutions described in the embodiments of the present application are applicable to a vehicle, which may be a fuel vehicle, a gas vehicle or a new-energy vehicle. The new-energy vehicle may be a battery electric vehicle, a hybrid vehicle, an extended-range vehicle, etc. The vehicle mentioned above is not specially limited in the embodiments of the present application.

In an existing vehicle, battery cells in a battery compartment are typically fixed in the battery compartment using an adhesive, so that if a battery cell fails later, it is difficult to repair and replace the battery cell, and the operation is inconvenient.

In order to solve the above technical problem, the inventors of the present application propose a chassis structure and a battery compartment structure of a vehicle. FIG. 1 is a schematic diagram of a structure of a chassis 100 of a vehicle according to some embodiments of the present application.

As shown in FIG. 1, the chassis 100 of a vehicle includes end frames 10 and a battery compartment 20, wherein the end frames 10 are configured for mounting suspensions; and the battery compartment 20 is configured for accommodating a battery.

In some embodiments, the suspension, also known as a suspension component, is an assembly of connecting mechanism between a wheel and a vehicle body, typically including a spring, a shock absorber, a swing arm and other accessories. The vehicle body is supported on the wheels by means of the suspensions, and the suspensions are configured for controlling the wheel hob to allow the vehicle to drive smoothly.

In some embodiments, the end frames 10 are configured for mounting the suspensions, a driving motor, and other vehicle components. For a four-wheeled vehicle, the end frames 10 may include a front end frame for mounting two front wheels and suspensions thereof and a rear end frame for mounting two rear wheels and suspensions thereof.

In some embodiments, the battery compartment 20 is configured for accommodating a battery and supplies power to the vehicle.

In some embodiments, a first direction X is a moving direction of the vehicle, including forward and backward directions.

Figure 2:
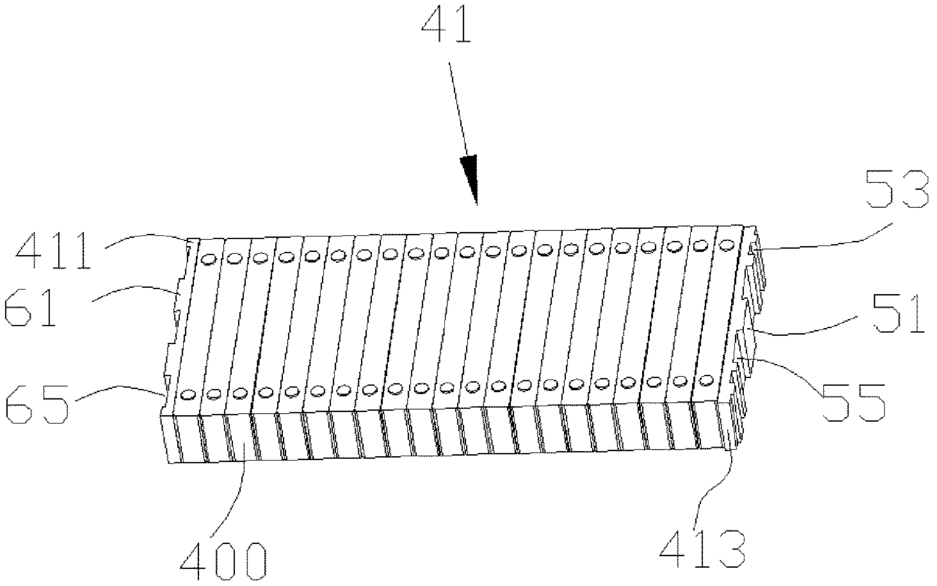
FIG. 2 is a schematic diagram of a structure of a first battery module according to some embodiments of the present application.
Figure 3:
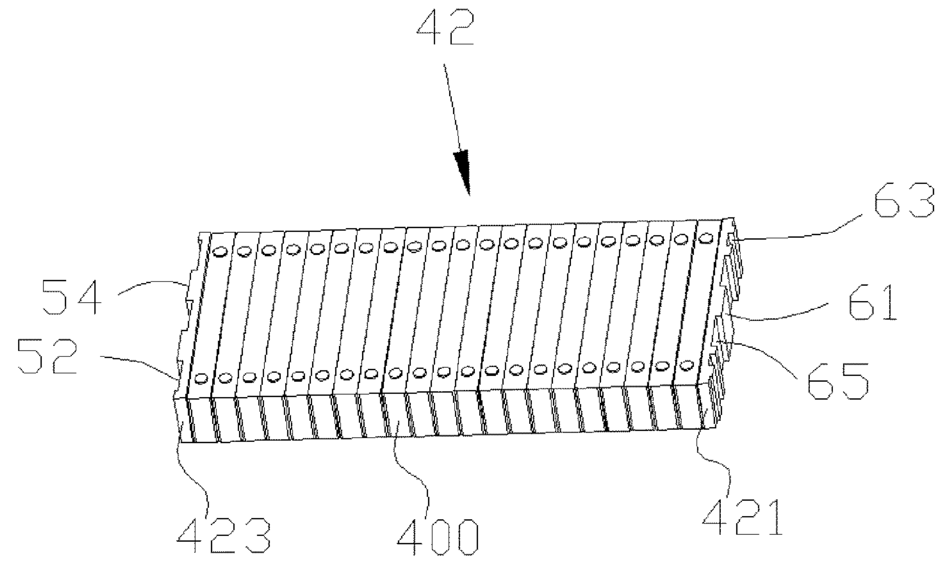
FIG. 3 is a schematic diagram of a structure of a second battery module according to some embodiments of the present application.
Figure 4:
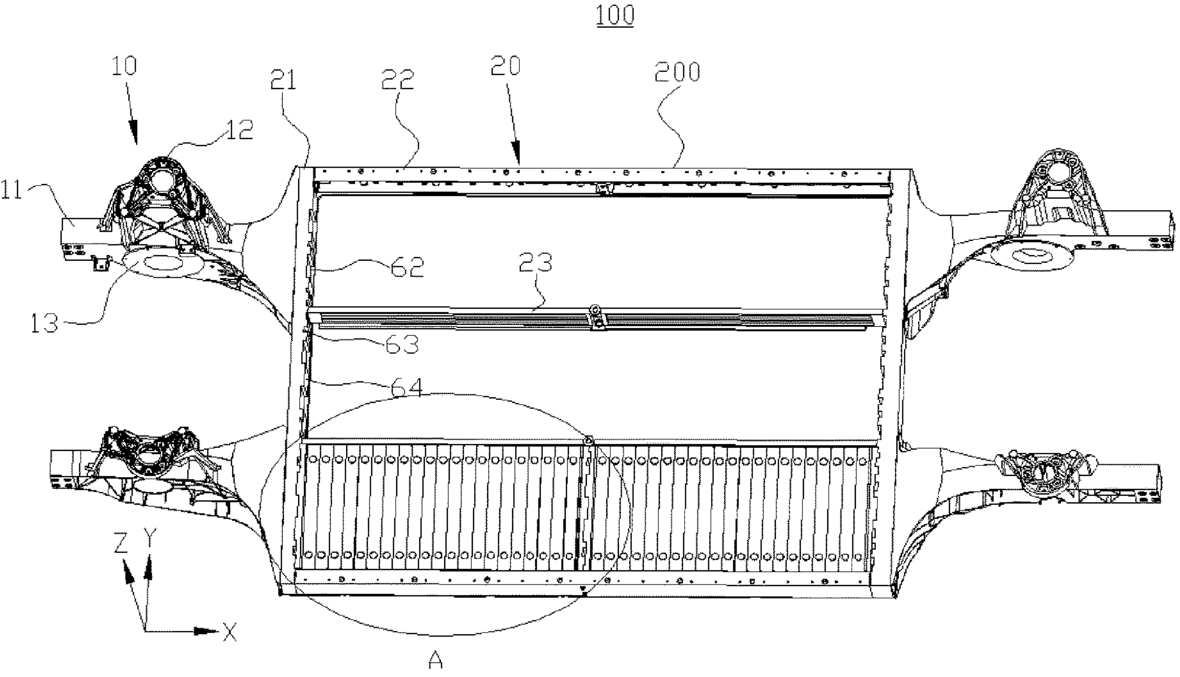
FIG. 4 is a schematic diagram of a structure of the chassis of a vehicle according to some embodiments of the present application in which battery modules are mounted.
Figure 5:
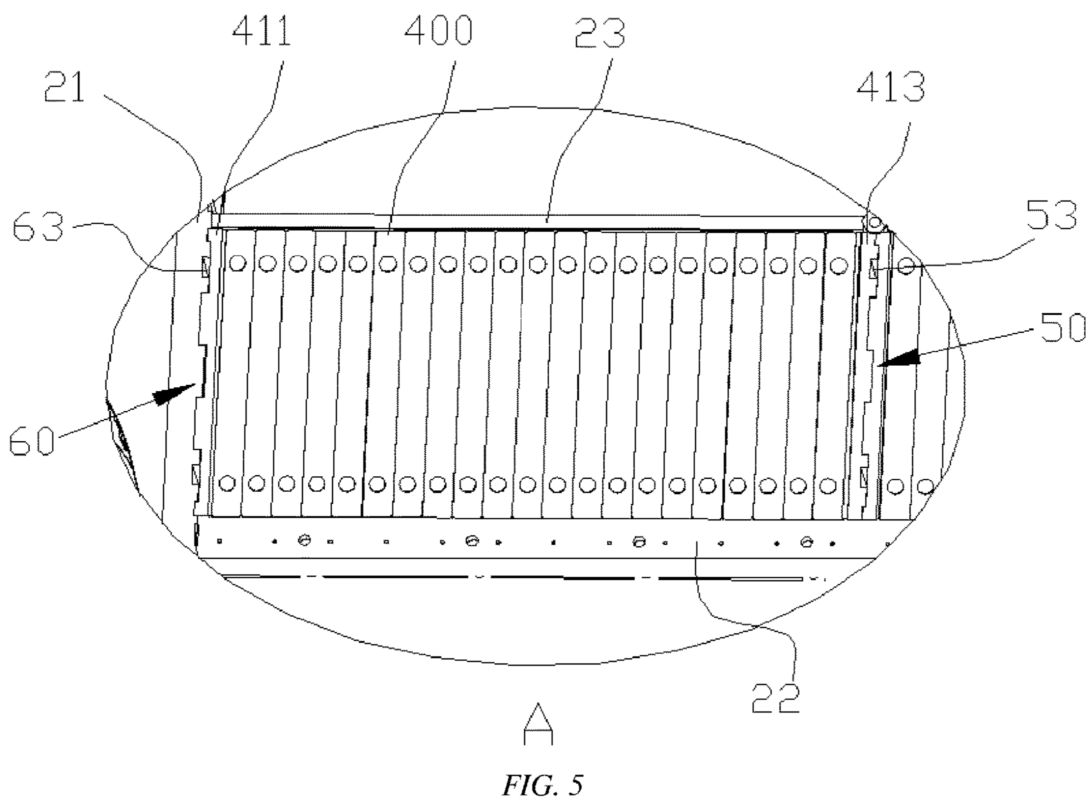
FIG. 5 is a partial enlarged view of part A in FIG. 4.
Figure 6:
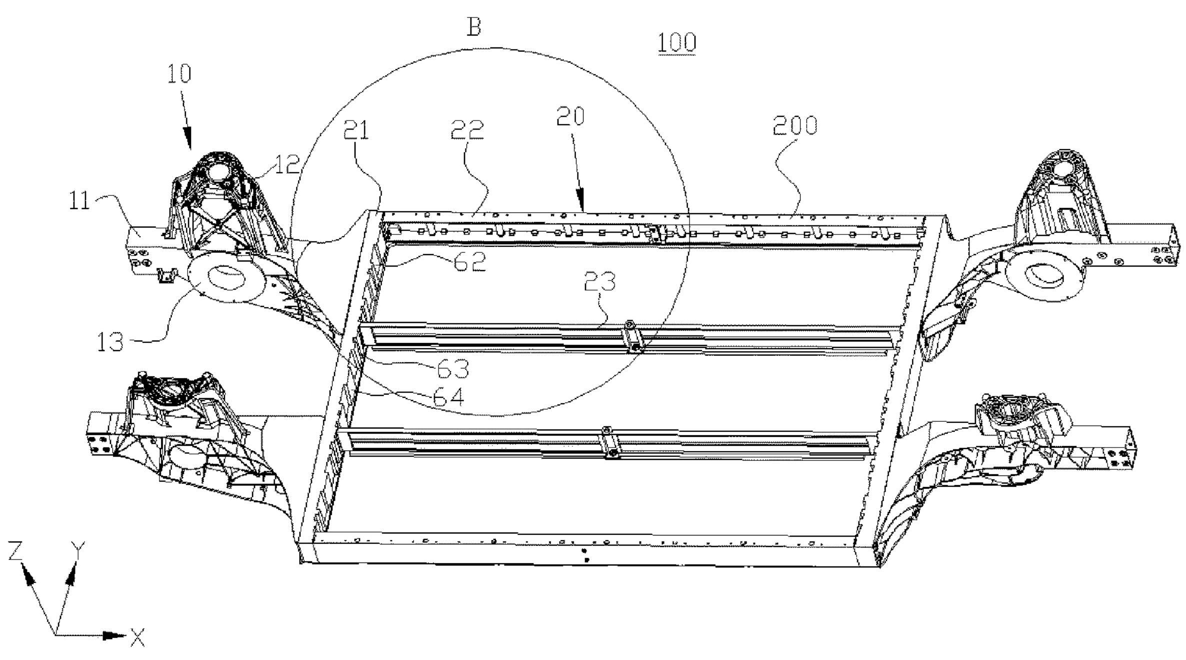
FIG. 6 is a schematic diagram of a structure of the chassis of a vehicle according to some embodiments of the present application in which no battery module is mounted.
Figures 7, 8:
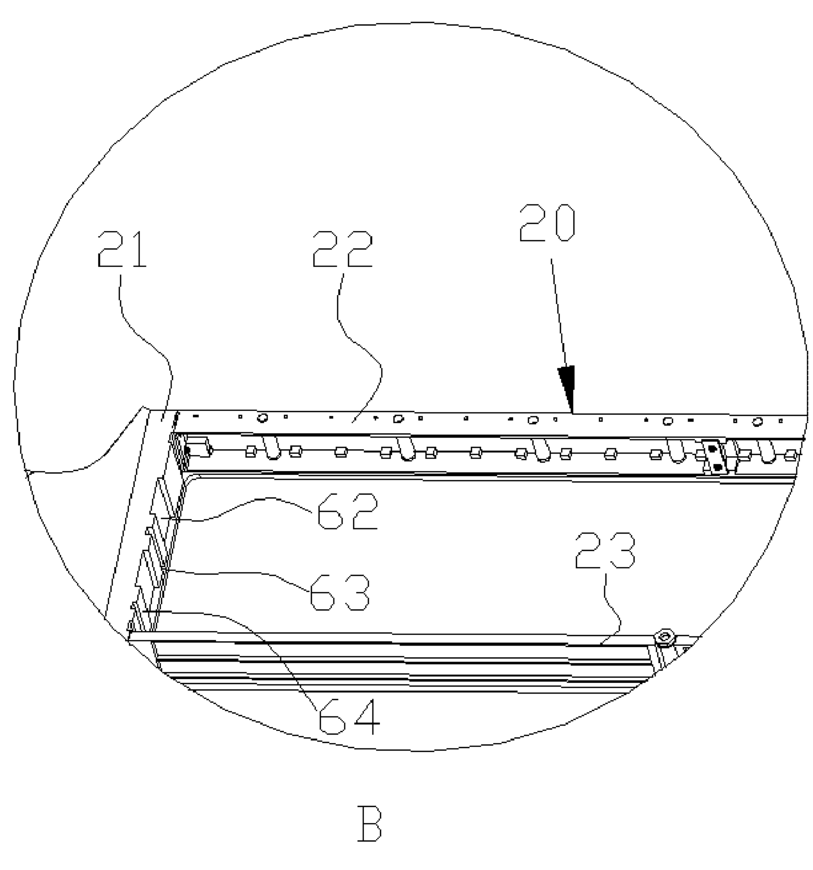
FIG. 7 is a partial enlarged view of part B in FIG. 6.
FIG. 8 is a simplified schematic diagram of a vehicle according to some embodiments of the present application.

FIG. 1 is a schematic diagram of a structure of a chassis of a vehicle according to some embodiments of the present application; FIG. 2 is a schematic diagram of a structure of a first battery module according to some embodiments of the present application; FIG. 3 is a schematic diagram of a structure of a second battery module according to some embodiments of the present application; FIG. 4 is a schematic diagram of a structure of the chassis of a vehicle according to some embodiments of the present application in which battery modules are mounted;

FIG. 5 is a partial enlarged view of part A in FIG. 4; FIG. 6 is a schematic diagram of a structure of the chassis of a vehicle according to some embodiments of the present application in which no battery module is mounted; FIG. 7 is a partial enlarged view of part B in FIG. 6.

In a first aspect of the embodiments of the present application, a battery compartment 20 is provided. As shown in the embodiments in FIGS. 1 to 7, the battery compartment 20 includes: a battery compartment frame 200 for accommodating battery modules 40; and at least two battery modules 40 disposed in the battery compartment frame 200; wherein each of the battery modules 40 includes a plurality of battery cells 400 and two end plates, the battery cells 400 are arranged in the first direction X, and the two end plates are respectively disposed on two ends of the plurality of battery cells 400 in the first direction X; the at least two battery modules 40 are arranged in a row in the first direction X; and the at least two battery modules 40 and the battery compartment frame 200 are configured to be in interference-fit in the first direction X. In this embodiment, by means of allowing the at least two battery modules 40 and the battery compartment frame 200 to be configured in interference-fit in the first direction X, the battery modules 40 are mounted in the battery compartment frame 200 in an interference-fit manner, the end plates on two sides of each battery module 40 clamp the battery cells 400 therebetween in the first direction X, and the battery cells 400 are fixed and held in the battery compartment frame 200 in a manner of being clamped in the first direction X, so that the battery cells 400 can be fixed without adhering the battery cells 400 in the battery compartment 20, and it is convenient to remove the battery modules 40 for repair or replacement of the battery cells 40, thereby improving the replacement and repair performance of the battery cells 400 in the battery compartment 20.

In some embodiments, there may be two, three, or more battery modules 40 arranged in a row in the first direction X. There may be one or more battery cells 400 in each battery module 40.

The at least two battery modules 40 and the battery compartment frame 200 being configured in interference-fit in the first direction X specifically means that, when not being stressed, the at least two battery modules 40 arranged in a row have a length in the first direction X slightly greater than the length of the internal space of the battery compartment frame 200, so that when the at least two battery modules 40 are placed in the battery compartment frame 200 in an interference-fit manner, the at least two battery modules 40 are clamped and fixed in the battery compartment frame 200 under the action of the clamping force of the battery compartment frame 200.

FIG. 2 shows a schematic diagram of a structure of a first battery module 41 according to some embodiments of the present application. FIG. 3 shows a schematic diagram of a structure of a second battery module 42 according to some embodiments of the present application. In FIG. 1, there may be two battery modules 40 arranged in a row in the first direction X, including the first battery module 41 and the second battery module 42. The first battery module 41 includes a plurality of battery cells 400, a first end plate 411 and a second end plate 413. The second battery module 42 includes a plurality of battery cells 400, a third end plate 421 and a fourth end plate 423.

The battery cells 400 are prismatic batteries, and the battery cells 400 are arranged such that an expansion direction of the battery cells 400 is parallel to the first direction X. That is, a side surface of the battery cell 400 having the largest area is perpendicular to the first direction X. The first direction X is a length direction of the vehicle, but not limited thereto, the first direction X may also be a width direction or a vertical direction of the vehicle.

In some embodiments, a first lifting slot 53 is formed between the two adjacent end plates of the two adjacent battery modules 40; and a second lifting slot 63 is formed between the battery compartment frame 200 and the end plate adjacent to the battery compartment frame 200.

Specifically, taking the embodiments shown in FIGS. 2 to 5 as an example, the first lifting slot 53 is formed between the second end plate 413 and the fourth end plate 423, which are adjacent to each other, of the first battery module 41 and the second battery module 42 adjacent to each other. A second lifting slot 63 is formed between the battery compartment frame 200 and the first end plate 411 of the first battery module 41 adjacent to the battery compartment frame 200. A second lifting slot 63 is also formed between the battery compartment frame 200 and the third end plate 421 of the second battery module 42 adjacent to the battery compartment frame 200.

In this embodiment, by means of providing the first lifting slot 53 and the second lifting slot 63, lifting tongs can operate to remove or place a single battery module 40, and during the removal or placement of the battery module 40, operation arms of the lifting tongs extend into the first lifting slot 53 and the second lifting slot 63 and apply pressing force to the battery module 40 in the first direction X so as to change the size of the battery module 40 in the first direction X after being pressed, so that the battery module 40 can be conveniently removed or placed.

In some embodiments, the two adjacent end plates of the two adjacent battery modules 40 are connected by means of a first engagement structure 50. The first engagement structure 50 can achieve mutual positioning of the two battery modules 40 and reduce the assembly gap between the two battery modules 40, thereby improving the space utilization of the battery compartment 20. Also, the two end plates are connected by means of the first engagement structure 50, and the combined structure of the two end plates can also reinforce the entire battery compartment 20, and can function to replace an intermediate member located between two adjacent battery modules in an existing battery compartment and extending in a third direction Y perpendicular to the first direction X, so that the internal structure of the battery compartment 20 is more compact, and the space utilization is high.

In some embodiments, the engagement structure is generally a recess-protrusion fit structure, including a protrusion provided on one of two mating components and a recess provided on the other component, the protrusion being in shape-fit with the recess to form a connecting and limiting structure. In some embodiments, the engagement structure includes alternately arranged protrusions and recesses provided on one of two mating components and alternately arranged recesses and protrusions provided on the other component, the protrusions being in shape-fit with the recesses to form the connection and limiting engagement structure.

In some embodiments, the first engagement structure 50 includes a first protrusion 51 provided on one of the two adjacent end plates of the two adjacent battery modules 40 and a first recess 52 provided on the other end plate, the first protrusion 51 being connected to the first recess 52 in an engagement manner. The first engagement structure 50 includes the first protrusion 51 and the first recess 52 provided on the two end plates of the two adjacent battery modules 40, and the first protrusion 51 is connected to the first recess 52 in an insertion manner to form the first engagement structure 50, which can achieve mutual limiting of the two battery modules 40 in the third direction Y perpendicular to the first direction X. In some embodiments, the third direction is a width direction of the vehicle, but not limited thereto, the third direction may also be the length direction or the vertical direction of the vehicle.

Specifically, in the embodiments as shown in FIGS. 2 to 5, the first engagement structure 50 is disposed between the second end plate 413 of the first battery module 41 and the fourth end plate 423 of the second battery module 42. The second end plate 413 is provided with the alternately arranged first protrusions 51 and third recesses 55, and the fourth end plate 423 is provided with the alternately arranged first recesses 52 and third protrusions 54. Between the second end plate 413 and the fourth end plate 423, the first recess 52 is connected to the first protrusion 51 in an insertion manner, and the third recess 55 is connected to the third protrusion 54 in an insertion manner, so as to form the first engagement structure 50, which can achieve mutual limiting of the two battery modules 40 in the third direction Y perpendicular to the first direction X.

In some embodiments, the first protrusion 51 protrudes in the first direction X, and the first recess 52 is recessed in the first direction X; the first protrusion 51 and the first recess 52 extend in the second direction Z; and the second direction Z is perpendicular to the first direction X and the third direction Y. On at least one end in the second direction Z, the first recess 52 is provided with a first insertion opening through which the first protrusion 51 is inserted or removed. The first protrusion 51 and the first recess 52 are connected to each other in an insertion manner in the first direction X to form the first engagement structure 50. When the battery module 40 is mounted or removed, the first protrusion 51 is inserted into the first recess 52 or exits from the first recess 52 through the first insertion opening in the second direction Z so as to achieve connection or separation of the two battery modules 40. The structure and fitting relationship of the third recess 55 and the third protrusion 54 are the same as those of the first recess 52 and the first protrusion 51.

In some embodiments, the second direction Z is a vertical direction. But not limited thereto, in some embodiments, the second direction Z may also be the width direction or the length direction of the vehicle.

In some embodiments, as shown in FIGS. 2 to 5, the first protrusion 51 is provided with a first lifting slot 53, and the first lifting slot 53 is recessed in the first direction X and extends in the second direction Z; and the first lifting slot 53 is provided with a second insertion opening on at least one end in the second direction Z. The first lifting slot 53 is provided on the first protrusion 51, so that the first lifting slot 53 can be arranged by making full use of space of the first protrusion 51, which facilitates operation of the lifting tongs. As shown in the figures, each battery module 40 is provided with a first lifting slot 53 on one or both ends in the first direction X, which is convenient for the lifting tongs to clamp the battery module 40 from two sides. In other embodiments, the first lifting slot 53 may also be provided on the third protrusion 54.

In some embodiments, referring to FIGS. 3 to 6, the battery compartment frame 200 includes two first side members 21 disposed oppositely in the first direction X; the at least two battery modules 40 include a battery module 40 connected to one of the first side members 21; and one end plate, opposite to one of the first side members 21, of the battery module 40 connected to the first side member 21 is connected to the first side member 21 by means of a second engagement structure 60. The second engagement structure 60 is disposed on the first side member 21 and the end plate of the battery module 40 opposite to the first side member 21, which can achieve connection and limiting between the first side member 21 and the battery module 40 adjacent to the first side member 21.

Specifically, in the embodiments as shown in FIGS. 4 to 7, the battery compartment frame 200 includes two first side members 21 disposed oppositely in the first direction X and two second side members 22 disposed oppositely in the third direction Y. The first side members 21 and the second side members 22 are connected to each other to enclose an accommodation space for accommodating the battery modules. In some embodiments, the battery compartment frame 200 further includes a bottom plate 24, and the bottom plate 24 is connected to the first side members 21 and the second side members 22 from the bottom and closes the battery compartment from the bottom. The battery compartment may be square or in other polygonal shapes.

In some embodiments, the second engagement structure 60 includes a second protrusion 61 provided on one of the first side member 21 and the end plate opposite to the first side member 21 and a second recess 62 provided on the other of the first side member 21 and the end plate opposite to the first side member 21, the second protrusion 61 being connected to the second recess 62 in an engagement manner. The second engagement structure 60 includes the second protrusion and the second recess respectively arranged on the first side member and the end plate of the battery module opposite to the first side member, and the second protrusion is connected to the second recess in an insertion manner to form the second engagement structure 60, which can achieve mutual limiting of the first side member 21 and the battery module 40 adjacent to the first side member in the third direction Y perpendicular to the first direction X.

Specifically, in the embodiments as shown in FIGS. 4 to 7, the second engagement structure 60 is disposed between the first end plate 411 of the first battery module 41 and the first side member 21. The first end plate 411 is provided with alternately arranged second protrusions 61 and fourth recesses 65, and the first side member 21 is provided with alternately arranged second recesses 62 and fourth protrusions 64. Between the first end plate 411 and the first side member 21, the second recess 62 is connected to the second protrusion 61 in an insertion manner, and the fourth recess 65 is connected to the fourth protrusion 64 in an insertion manner, so as to form the second engagement structure 60, which can achieve mutual limiting of the first battery module 41 and the first side member 21 in the third direction Y perpendicular to the first direction X.

In some embodiments, the second protrusion 61 protrudes in the first direction X, and the second recess 62 is recessed in the first direction X; the second protrusion 61 and the second recess 62 extend in the second direction Z; the second direction Z is perpendicular to the first direction X; and on at least one end in the second direction Z, the second recess 62 is provided with a third insertion opening through which the second protrusion 61 is inserted or removed. The second protrusion 61 and the second recess 62 are connected to each other in an insertion manner in the first direction X to form the second engagement structure 60. When the battery module 40 is mounted or removed, the second protrusion 61 is inserted into the second recess 62 or exits from the second recess 62 through the third insertion opening in the second direction Z, so that the battery module 40 is connected to or separated from the first side member 61. The structure and fitting relationship of the fourth recess 65 and the fourth protrusion 64 are the same as those of the second recess 62 and the second protrusion 61.

In some embodiments, as shown in FIG. 6, the fourth protrusion 64 is provided with a second lifting slot 63, and the second lifting slot 63 is recessed in the first direction X and extends in the second direction Z; and the second lifting slot 63 is provided with a fourth insertion opening on at least one end in the second direction Z. The second lifting slot 63 is provided on the fourth protrusion 64, so that the second lifting slot 63 can be arranged by making full use of space of the fourth protrusion 64, which facilitates operation of the lifting tongs. In other embodiments, the second lifting slot 63 may also be provided on the second protrusion 61.

In some embodiments, multiple rows of the battery modules 40 are provided in the battery compartment frame 200; the multiple rows of the battery modules 40 are arranged in the third direction Y, and the third direction Y is perpendicular to the first direction X; and an intermediate member 23 is provided between the two adjacent rows of the battery modules 40, and two ends of the intermediate member 23 are respectively connected to the first side members 21. By means of providing the intermediate member 23, the position of each row of the battery modules 40 in the third direction Y can be limited, and the intermediate member 23 can also reinforce the battery compartment frame 200.

Referring to the embodiments as shown in FIGS. 1 to 7, in a second aspect of the present application, a chassis 100 is provided. The chassis 100 includes the battery compartment frame 200 in the above embodiments, and end frames 10 for mounting suspensions. The end frames 10 are connected to end portions of the battery compartment frame 200 of the battery compartment 20 in the first direction X. The battery compartment 20 is directly connected to the end frames 10, so that cross members, longitudinal members and other structures at a cab part of a conventional chassis are omitted, greatly reducing the number of components of the vehicle, which improves the space utilization of the chassis 100 and is conducive to carrying more batteries in the battery compartment 20, thereby further improving the endurance of the vehicle.

In some embodiments, the end frames 10 include a front end frame and a rear end frame. The front end frame is mounted at the front of the battery compartment 20, and the rear end frame is mounted at the rear of the battery compartment 20.

In some embodiments, each end frame 10 includes two frame longitudinal members 11 and two shock absorber towers 12, wherein each of the frame longitudinal members 11 is provided with one shock absorber tower 12; a set of suspensions are mounted on each of the frame longitudinal members 11 and the corresponding shock absorber tower 12; and the two frame longitudinal members 11 are connected to the battery compartment frame 200. In this embodiment, the end frame 10 includes two frame longitudinal members 11 and two shock absorber towers 12, and a set of suspensions are mounted on each frame longitudinal member 11 and the corresponding shock absorber tower 12. The suspensions are directly mounted on the frame longitudinal members 11 and the shock absorber towers 12, which can omit a subframe and other suspension mounting structures of the vehicle, greatly reducing the number of components of the end frames to achieve higher integration level. The two frame longitudinal members 11 are mounted at the end portions of the battery compartment 20, and the end frames 10 are directly carried by the battery compartment, which omits the cross members, longitudinal member and other structures of the vehicle, so that the entire chassis has a compact structure and less components and is lightweight.

In some embodiments, the frame longitudinal member 11 is further provided with a motor mounting base 13. By means of providing the motor mounting base 13, a driving motor can be mounted on the frame longitudinal members 11 and supported by the frame longitudinal members 11, which further improves the compactness of the chassis 100 and reduces the number of components.

In a third aspect of the present application, a vehicle is provided. The vehicle includes the chassis of a vehicle in the above embodiments.

FIG. 8 is a simplified schematic diagram of a vehicle according to some embodiments of the present application.

As shown in FIG. 8, a battery 2 is disposed inside the vehicle 1, and the battery 2 may be disposed in a battery compartment 20 of the vehicle 1. The battery 2 may be configured to supply power to the vehicle 1, for example, the battery 2 may serve as a power supply for operating the vehicle 1.

The vehicle 1 may further include a controller 3 and a motor 4. The controller 3 is configured for controlling the battery 2 to supply power to the motor 4, for example, to meet working power requirements during starting, navigation and traveling of the vehicle 1.

In some embodiments of the present application, the battery 2 can not only serve as a power supply for operating the vehicle 1, but can also serve as a power supply for driving the vehicle 1, in place of or partially in place of fuel or natural gas, to provide driving power for the vehicle 1.

Those skilled in the art should understand that, although some of the embodiments herein include some features, but not other features, included in other embodiments, the combination of the features of different embodiments means being within the scope of the present application and forms different embodiments. For example, in the claims, any one of the claimed embodiments may be used in any combination.

The foregoing embodiments are merely used for illustrating rather than limiting the technical solutions of the present application. Although the present application has been illustrated in detail with reference to the foregoing embodiments, it should be understood by those of ordinary skill in the art that the technical solutions recited in the foregoing examples may still be modified, or some of the technical features thereof may be equivalently substituted; and the modifications or substitutions do not make the essence of the corresponding technical solutions depart from the spirit and scope of the technical solutions of the embodiments of the present application.

What is claimed is:

1. A battery compartment, comprising:

a battery compartment frame configured to accommodate battery modules; and at least two battery modules disposed in the battery compartment frame;

wherein:

each of the battery modules comprises a plurality of battery cells and two end plates, the plurality of battery cells being arranged in a first direction, and the two end plates being respectively disposed on two ends of the plurality of battery cells in the first direction;

the at least two battery modules are arranged in a row in the first direction; and the at least two battery modules and the battery compartment frame are configured in interference-fit in the first direction.

2. The battery compartment of claim 1, wherein:

a first lifting slot is formed between two adjacent end plates of two adjacent battery modules; and a second lifting slot is formed between the battery compartment frame and an end plate adjacent to the battery compartment frame.

3. The battery compartment of claim 1, wherein two adjacent end plates of two adjacent battery modules are connected by means of a first engagement structure.

4. The battery compartment of claim 3, wherein the first engagement structure comprises a first protrusion provided on one of the two adjacent end plates of the two adjacent battery modules and a first recess provided on the other end plate, the first protrusion being connected to the first recess in an engagement manner.

5. The battery compartment of claim 4, wherein:

the first protrusion protrudes in the first direction, and the first recess is recessed in the first direction;

the first protrusion and the first recess extend in a second direction perpendicular to the first direction; and on at least one end in the second direction, the first recess is provided with a first insertion opening through which the first protrusion is inserted or removed.

6. The battery compartment of claim 4, wherein:

the first protrusion is provided with a first lifting slot recessed in the first direction and extending in a second direction; and the first lifting slot is provided with a second insertion opening on at least one end in the second direction perpendicular to the first direction.

7. The battery compartment of claim 1, wherein:

the battery compartment frame comprises two first side members disposed oppositely in the first direction;

the at least two battery modules include a battery module connected to one of the first side members; and one end plate, opposite to the one of the first side members, of the battery module connected to the one of the first side members is connected to the one of the first side members by means of a second engagement structure.

8. The battery compartment of claim 7, wherein the second engagement structure comprises a second protrusion provided on one of the one of the first side members and the end plate opposite to the one of the first side members and a second recess provided on the other of the one of the first side members and the end plate opposite to the one of the first side members, the second protrusion being connected to the second recess in an engagement manner.

9. The battery compartment of claim 8, wherein:

the second protrusion protrudes in the first direction, and the second recess is recessed in the first direction;

the second protrusion and the second recess extend in a second direction perpendicular to the first direction; and on at least one end in the second direction, the second recess is provided with a third insertion opening through which the second protrusion is inserted or removed.

10. The battery compartment of claim 8, wherein:

the second protrusion is provided with a second lifting slot recessed in the first direction and extending in a second direction; and the second lifting slot is provided with a fourth insertion opening on at least one end in the second direction perpendicular to the first direction.

11. The battery compartment of claim 7, wherein:

multiple rows of the battery modules are provided in the battery compartment frame;

the multiple rows of the battery modules are arranged in a third direction perpendicular to the first direction; and an intermediate member is provided between two adjacent rows of the battery modules, and two ends of the intermediate member are respectively connected to the first side members.

12. A chassis, comprising:

the battery compartment of claim 1; and end frames for mounting suspensions;

wherein the end frames are connected to end portions of the battery compartment frame of the battery compartment in the first direction.

13. The chassis of claim 12, wherein the end frames include a front end frame and a rear end frame.

14. The chassis of claim 12, wherein:

the end frames comprise two frame longitudinal members, two shock absorber towers and a first cross member, and each of the frame longitudinal members is provided with one shock absorber tower;

a set of suspensions are mounted on each of the frame longitudinal members and the corresponding shock absorber tower; and the two frame longitudinal members are connected to the battery compartment frame.

15. The chassis of claim 14, wherein a motor mounting base is further provided on the frame longitudinal members.

16. A vehicle, comprising the chassis of claim 12.

* * * * *